P. L. WIKHEIM.
TRANSMISSION GEAR LOCK FOR AUTOMOBILES.
APPLICATION FILED OCT. 24, 1918.
1,316,128.
Patented Sept. 16, 1919.
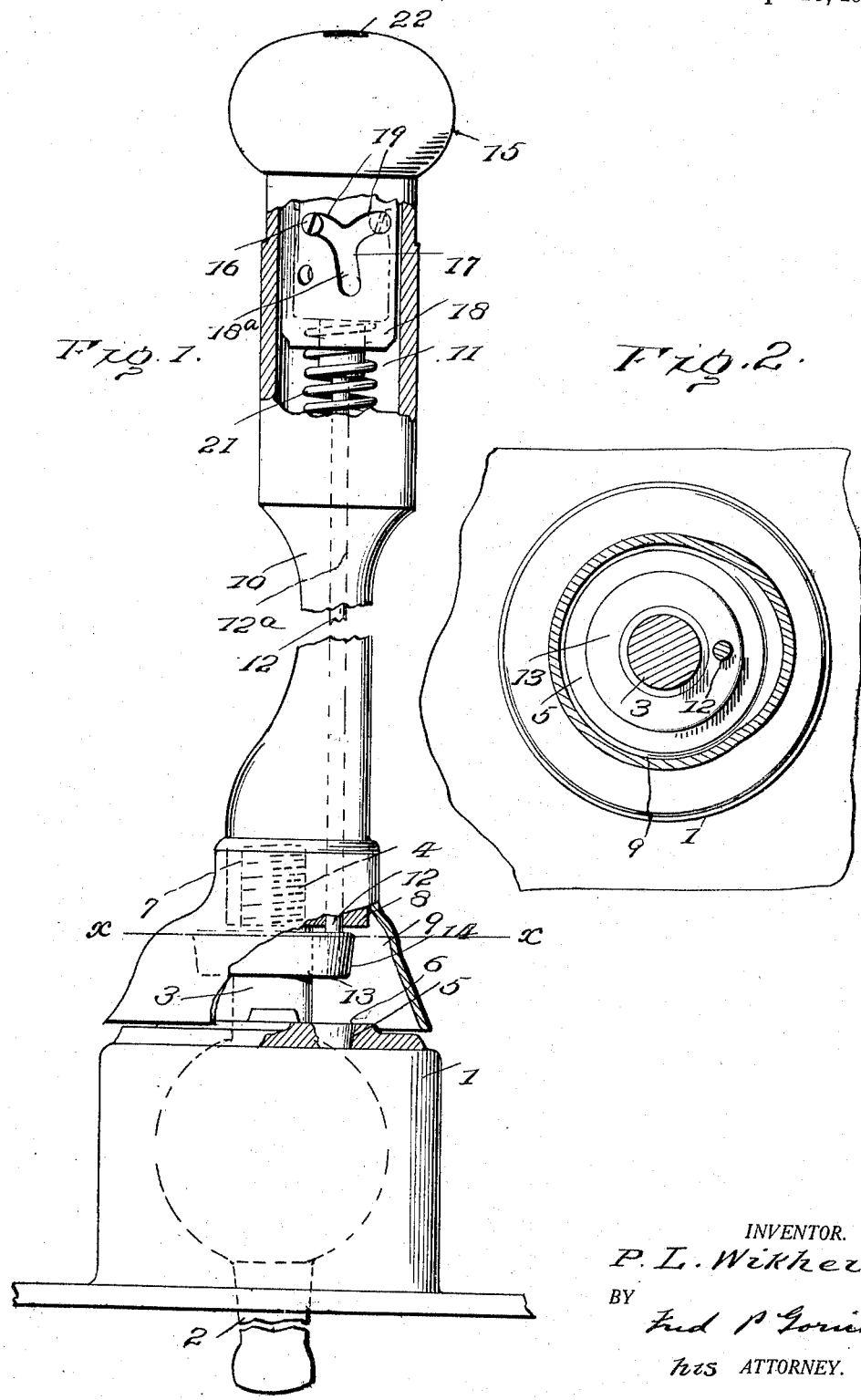
INVENTOR.
P. L. Wikheim
BY
Fred P Gorin
his ATTORNEY.

UNITED STATES PATENT OFFICE.

PEDER L. WIKHEIM, OF SEATTLE, WASHINGTON.

TRANSMISSION-GEAR LOCK FOR AUTOMOBILES.

1,316,128.     Specification of Letters Patent.     Patented Sept. 16, 1919.

Application filed October 24, 1918. Serial No. 259,472.

*To all whom it may concern:*

Be it known that I, PEDER L. WIKHEIM, citizen of the United States, residing at Seattle, in the county of King and State of Washington, have invented certain new and useful Improvements in Transmission-Gear Locks for Automobiles, of which the following is a specification.

This invention relates to improvements in means for locking the shift lever of the transmission mechanism of an automobile.

The prime object of the invention is to provide improved means for locking the usual gear shift lever of an automobile to prevent unauthorized persons from throwing the gears of the automobile into operation position.

A further object of the invention is to provide interlocking mechanism in the lower end of a shaft lever, to prevent movement of the latter, and associate therewith a lock located in the head of the lever, and which is operative when the interlocking mechanism is actuated.

The invention also comprehends improvements in the details of construction and arrangement of parts which will be hereinafter described and particularly pointed out in the claim.

In the drawings:—

Figure 1 is a side elevation of a shift lever, with parts broken away to illustrate the locking mechanism.

Fig. 2 is a horizontal section of the same on the line $x$—$x$ of Fig. 1.

1 indicates a base or housing in which is universally mounted intermediate gear actuating lever 2, provided with an extension 3, which is threaded on its upper end as at 4. Concentrically mounted with reference to the extension 3, is a fixed collar 5, the inner annular wall of which is slightly inclined downwardly and inwardly, as indicated at 6.

The threaded end 4, of the extension 3, engages a threaded opening 7, formed in the wall 8, of a flared compartment 9, on the lower end of a shifting lever 10. The upper end of this lever is enlarged and is hollow to form a lock compartment 11, and extending through the lever is an opening $12^a$, which communicates with the compartments 9 and 11, as shown.

A rod 12, is mounted in the opening $12^a$, and its lower end is connected to a locking ring 13, slidably mounted on the extension 3. The locking ring corresponds to the diameter of the opening in the fixed collar 5, and its edges are beveled, as at 14, to correspond to the inclination of the inner wall of said collar, for a purpose to be described.

On the upper end of the shift lever 10, is a cap 15, and to the cap is fastened the upper end of the rod 12.

Mounted within the upper compartment 11, and connected to move with the cap 15, is a laterally extended stud or screw 16, the outer end of which rides in a slot 17, formed in a plate 18, attached to the inner wall of the compartment. The slot 17, is substantially T-shape, in side view, and comprises a vertical slightly inclined portion $18^a$, and laterally extended upper portions 19.

Between the cap and the bottom of the upper compartment 11, is a spring 21, mounted on the rod 12, which serves to retain rod and cap in elevated position and within the cap is a lock (not shown) which may be operated by a key inserted in a key opening 22 in the top of the cap.

Normally the spring elevates the cap on the upper end of the shift lever, and holds the locking ring above and out of contact with the fixed collar 5, the lug 16, engaging in one of the lateral portions 19, of the slot and prevents the cap being depressed. When the parts are in this position, the shift lever can be operated in the usual way to shift the gears, as the extension 3, can move freely in the collar. To lock the shift lever, the cap 15, is slightly rotated until the lug 16, registers with the vertical portion of the slot and then pressure on the cap forces the lug down the vertical portion of the slot, and also forces down the rod 12, against the tension of the spring 21. In lowering the rod, the locking ring is forced into the fixed collar 5, at which time the lock in the cap operates to hold the parts in interlocked position.

When the locking ring is engaged with the fixed collar, the shift lever becomes fixed to the housing, and it follows that the gears cannot be shifted. To release the interlock between the lever and the housing, a key is inserted in the key opening 22, whereupon the spring 21, acts to raise the rod and the cap, and disengages the locking ring from the collar, hence the lever may be shifted in the usual manner.

The invention is extremely simple in construction and because of it being involved in the construction of the shift lever no additional space is occupied.

What I claim is:—

In combination, a base provided with a bearing, and a circular seat, a ball mounted in the bearing, a stud extending from the ball, a hollow shift lever mounted on the end of the stud, a collar slidably mounted on the stud and adapted when moved, to fit in the circular seat, a rod connected to the collar at one side of the stud and extended up through the hollow lever, a spring for normally elevating the rod, and a knob on the upper end of the rod, whereby when the rod is depressed, the collar engages in the circular seat and movement of the lever is prevented.

In testimony whereof I affix my signature.

PEDER L. WIKHEIM.